United States Patent
Knott

(10) Patent No.: US 7,796,409 B2
(45) Date of Patent: Sep. 14, 2010

(54) MULTILEVEL PUSH PULL POWER CONVERTER

(75) Inventor: Arnold Knott, Michaelsbuch (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 369 days.

(21) Appl. No.: 11/624,491

(22) Filed: Jan. 18, 2007

(65) Prior Publication Data

US 2007/0201249 A1  Aug. 30, 2007

(30) Foreign Application Priority Data

Jan. 18, 2006  (EP)  .................................. 06000971

(51) Int. Cl.
*H02M 3/337* (2006.01)
(52) U.S. Cl. .............................. 363/24; 363/25; 363/26; 363/39; 363/40; 363/41; 363/133; 363/134
(58) Field of Classification Search .................. 363/24, 363/25, 26, 39, 40, 134, 133
See application file for complete search history.

(56) References Cited

U.S. PATENT DOCUMENTS

| | | | | |
|---|---|---|---|---|
| 3,506,777 | A | * | 4/1970 | Carlson ........................ 386/16 |
| 3,706,022 | A | * | 12/1972 | Corey et al. ................... 363/24 |
| 3,832,623 | A | * | 8/1974 | Boyden et al. .............. 363/134 |
| 3,887,822 | A | * | 6/1975 | Suzuki ........................ 327/211 |
| 3,925,715 | A | * | 12/1975 | Venable ...................... 363/26 |
| 4,301,499 | A | * | 11/1981 | Levinson ..................... 363/26 |
| 4,607,322 | A | * | 8/1986 | Henderson ............... 363/56.08 |
| 4,695,935 | A | * | 9/1987 | Oen et al. ................... 363/21.1 |

(Continued)

FOREIGN PATENT DOCUMENTS

FR  2686749  2/1993  .................... 7/538

OTHER PUBLICATIONS

Song et al.: "Dual-Bridge DC-DC Converter: a New Topology Characterized With No Deadtime Operation", IEEE Transactions on Power Electronics, vol. 19, No. 1, Jan. 2004.

(Continued)

*Primary Examiner*—Edward Tso
*Assistant Examiner*—Manuel Hernandez
(74) *Attorney, Agent, or Firm*—O'Shea Getz P.C.

(57) ABSTRACT

A power converter for converting an input voltage (Vin) into an output voltage (Vout), comprising a first supply potential and a second supply potential established by the input voltage, and at least one primary winding having two terminals, a center tap arranged between the two terminals and connected to the first supply potential, and at least one secondary winding magnetically coupled to the primary winding for providing at least one output voltage (Vout) and a first controllable switch connected between the second supply potential and one terminal of the primary winding and a second controllable switch connected between the second supply potential and the other terminal of the primary winding and a third controllable switch connected between the second supply potential and the one terminal of the primary winding and a fourth controllable switch connected between the second supply potential and the other terminal of the primary winding, and a control unit for controlling the switches such that the first, second, third, and fourth switches are turned on sequentially wherein at any time maximum one switch is turned on.

27 Claims, 15 Drawing Sheets

U.S. PATENT DOCUMENTS

| | | | |
|---|---|---|---|
| 5,113,333 A | 5/1992 | Ou | 363/25 |
| 5,181,160 A * | 1/1993 | Okamoto et al. | 363/97 |
| 5,357,418 A * | 10/1994 | Clavel | 363/89 |
| 5,659,460 A * | 8/1997 | Vinciarelli | 363/21.03 |
| 5,684,680 A * | 11/1997 | Tahhan et al. | 363/26 |
| 5,729,444 A * | 3/1998 | Perol | 363/25 |
| 5,737,208 A | 4/1998 | Chen | 363/133 |
| 5,892,666 A * | 4/1999 | Gucyski | 363/24 |
| 6,184,666 B1 | 2/2001 | Boeckmann et al. | 323/282 |
| 6,222,475 B1* | 4/2001 | Okada | 341/156 |
| 6,314,006 B1* | 11/2001 | Berberich et al. | 363/25 |
| 6,317,336 B1* | 11/2001 | Jiang et al. | 363/16 |
| 6,995,987 B2 | 2/2006 | Song et al. | 363/17 |
| 7,109,688 B1* | 9/2006 | Chiu et al. | 323/222 |
| 2007/0247877 A1* | 10/2007 | Kwon et al. | 363/25 |

OTHER PUBLICATIONS

Karsten Nielsen: "Audio Power Amplifier Techniques With Energy Efficient Power Conversion" Department of Applied Electronics, Chapter 2, Apr. 30, 1998.

Stanley et al.: "Precision DC-to-AC Power Conversion by Optimization of the Output Current Waveform — the Half Bridge Revisited", IEEE Transactions on Power Electronics, vol. 14, No. 2, Mar. 1999.

Severns et al.: "Modern DC-to-DC Switchmode Power Converter Circuits", pp. 183-198, San Rafael, California USA, 1984, No month available.

Mohan et al., "Power Electronics: Converters, Applications and Design," Wiley & Sons, NY 1989, pp. 92, 514-515.

European Search Report.

* cited by examiner

| | $t_0<t<t_1$ | $t_1<t<t_2$ | $t_2<t<t_3$ | $t_3<t<t_4$ |
|---|---|---|---|---|
| $V_{s1}$ | 0 | $\dfrac{N_{p3}}{N_{p1}+N_{p3}} \cdot V_s$ | $\left(\dfrac{N_{p1}}{N_{p2}}+1\right) \cdot V_s$ | $\dfrac{N_{p1}+N_{p2}+N_{p4}}{N_{p2}+N_{p4}} \cdot V_s$ |
| $V_{s2}$ | $\left(\dfrac{N_{p2}}{N_{p1}}+1\right) \cdot V_s$ | $\dfrac{N_{p1}+N_{p2}+N_{p3}}{N_{p1}+N_{p3}} \cdot V_s$ | 0 | $\dfrac{N_{p4}}{N_{p2}+N_{p4}} \cdot V_s$ |
| $V_{s3}$ | $-\dfrac{N_{p3}}{N_{p1}} \cdot V_s$ | 0 | $\dfrac{N_{p1}+N_{p2}+N_{p3}}{N_{p2}} \cdot V_s$ | $\dfrac{\sum_{\mu=1}^{4} N_{p\mu}}{N_{p2}+N_{p4}} \cdot V_s$ |
| $V_{s4}$ | $\dfrac{N_{p1}+N_{p2}+N_{p4}}{N_{p1}} \cdot V_s$ | $\dfrac{\sum_{\mu=1}^{4} N_{p\mu}}{N_{p1}+N_{p3}} \cdot V_s$ | $-\dfrac{N_{p4}}{N_{p2}} \cdot V_s$ | 0 |
| $V_{Ns1}$ | $-\dfrac{N_{s1}}{N_{p1}} \cdot V_s$ | $-\dfrac{N_{s1}}{N_{p1}+N_{p3}} \cdot V_s$ | $-\dfrac{N_{s1}}{N_{p2}} \cdot V_s$ | $\dfrac{N_{s1}}{N_{p2}+N_{p4}} \cdot V_s$ |
| $V_{Ns2}$ | $\dfrac{N_{s2}}{N_{p1}} \cdot V_s$ | $\dfrac{N_{s2}}{N_{p1}+N_{p3}} \cdot V_s$ | $-\dfrac{N_{s2}}{N_{p2}} \cdot V_s$ | $-\dfrac{N_{s2}}{N_{p2}+N_{p4}} \cdot V_s$ |

FIG. 4A

MULTILEVEL PUSH PULL POWER CONVERTER

CLAIM OF PRIORITY

This patent application claims priority to European Patent Application serial number 06 000 971.9 filed on Jan. 18, 2006.

FIELD OF THE INVENTION

The present invention relates to a power converter and, in particular, a push-pull direct current to direct current (DC-DC) power converter.

RELATED ART

DC-DC power converters are electronic devices that change DC electrical power efficiently from one voltage level to another. Typical industrial applications of DC-DC converters are, for example, where 24V DC from a truck battery is stepped down to 12V DC to run a car radio, where 1.5V from a single cell battery is stepped up to 5V or more to operate some electronic circuitry, or where 12V DC is stepped up to +/−40V to drive a car HiFi amplifier circuitry.

There are many different types of DC-DC power converters, each of which tends to be more suitable for some kinds of applications than for others. One type of DC-DC power converter is the isolating converter, which is generally used in applications that require full dielectric isolation between the converter's input and output circuits. A known type of the isolating converter is the push-pull type, which is widely used in high power applications.

The basic circuitry of a typical push-pull DC power converter, as shown in FIG. 1, includes a first supply potential 11 and a second supply potential 12 established by an input voltage Vin. A primary winding W1 having two end terminals T1 and T2 and a center tap 13 is coupled to one of the two supply potentials, here 11, with the center tap dividing the primary winding into two halves, the first half Np1 between the center tap and the first end terminal T1 and the second half Np2 between the center tap and the second end terminal T2. The converter includes at least one secondary winding W2. Here two halves Ns1 and Ns2 of the secondary winding W2, has the same number of turns and is magnetically coupled to the primary winding W1 for providing at least one output voltage Vout—multiple secondary winding is a common practice in power converters. Different secondary windings may have the same or different number of turns thereon. Two switches S1 and S2 are connected to either end terminal of the primary winding. The first switch S1 is connected between the first terminal T1 and the second supply potential 12, and the second switch S2 is connected between the second terminal T2 and the second supply potential 12. A control unit 16 is coupled to the input voltage or any other voltage and to the two switches for turning on and off the switches alternately, that is, the switches are never turned on at the same time. In particular, the control unit may generate two control signals C1 and C2 for controlling the switches S1 and S2, respectively.

In operation, the input voltage is first supplied to the first half primary winding Np1, and then to the other half Np2. This cycle is repeated continuously and at a relatively high rate, often many tens or even hundreds of kilohertz. Thus, in effect, the switches S1 and S2 convert the DC input voltage into a high frequency alternating current (AC) square wave. As a result, at the secondary side, a corresponding AC square wave is generated with a peak voltage Vac(pk) equal to (during each half-cycle): V[in ×(L3/L1)], where L3 is the number of turns of the secondary winding Ns1 while L1 is the number of turns of the first primary winding half Np1. Diodes D1, D2, D3, and D4 are connected directly across the secondary windings as a bridge rectifier, so the AC square wave appearing across the secondary windings is rectified back into a high voltage DC signal, to feed the load and maintain the charge on filter capacitor C through a filter inductor L. The DC output voltage Vout is equal to the peak AC output, that is, Vout=Vin×(L3/L1).

FIG. 2 shows the corresponding signals which apply to the push-pull power converter as shown in FIG. 1. The detailed operation of this power converter can be understood with a brief explanation of the waveforms of these signals. From the figure, it can be seen that the first switch S1 and the second switch S2 are never turned on at the same time; they are however turned on alternately. For example, from time t0 to t1, the first switch S1 is on (i.e., the voltage across the switch S1, $V_{S1}$, is zero) while the second switch S2 is off (i.e., the voltage across switch S2, $V_{S2}$, is not zero); and from time t2 to t3, the second switch S2 is on while the first switch S1 is off. When the first switch S1 is turned on, the input voltage Vin generates a current flow through the first half primary winding Np1 and, as a result, voltages are generated across the secondary windings; especially, a voltage $V_{NS1}$, is generated across the secondary winding Ns1. Next, at time t1, the first switch S1 is switched off and the second switch S2 is not yet switched on; therefore, there is no current flowing through either winding Np1 or Np2 and, accordingly, no voltage is generated across the secondary winding Np1 or Np2. Then, from time t2 to t3, the second switch S2 is switched on while the first switch S1 remains switched off; this results in a similar situation as from time t0 to t1, except for a change between the positive and negative in the voltage signals generated at the secondary side. Lastly, at time t3, the second switch S2 is switched off while the first switch S1 is not yet switched on; thus resulting in the same situation as from time t1 to t2.

Like many other DC-DC power converters, the push-pull converter generally operates at a relatively high frequency, because a high frequency allows the use of smaller inductors, transformers, and capacitors to handle the same power level but without creating a bigger ripple current—thus achieving a reduction in both the size and material costs of the converter. The filter induction can be calculated as the following equation:

$$L = \frac{U \cdot \Delta t}{\Delta I} = \frac{U}{f \cdot \Delta I}$$

According to the above equation, switched circuits with high power require big input filter inductors (L, inductance) in order to obtain a low ripple current ($\Delta I$) in input and output, where it is assumed that the current has a trapezoidal waveform (therefore using a difference instead of differential). One way to lower the inductance is to lower parameters such as the voltage, but these parameters are usually fixed requests. If the ripple current needs to be maintained, a higher switching frequency is then required, which would unfortunately bring higher switching losses. However, as switching frequency is a trade-off between static and dynamic losses (see Fundamentals of Power Electronics, ISBN 0-7923-7270-0), when a higher frequency is applied to the electrical switches, such as MOSFETs, more dynamic power dissipation would occur at them. Therefore, it is preferred to increase the input and output ripple frequency by connecting switches in parallel and making them out of phase or lowering di/dt at the input and output—this is exactly what the push-pull converter does. With the push-pull converter, the switching frequency from the switches occurs doubled at the filters.

With the development of the power converter technology, various ways to reduce filter impedances have been proposed for push-pull converters. In Wei Song and Bred Lehman's "*Dual Bridge DC-DC Converter: A New Technology Characterized With No Dead Time Operation*," IEEE Transaction on Power Electronic, 19 (1), January 2004, and WO 03/058800 to Wei Song, Bred Lehman, a technology is disclosed to minimize the dead time in DC-DC converters to lower the filter impedances for getting the same ripple current. The same effect is achieved by the so called "interleave" technology described in Gerald R. Stanley and Kenneth M. Bradshaw's "*Precision DC-to-AC Power Conversion by Optimization of the Output Current Waveform—The Half Bridge Revisited*", IEEE Transactions on Power Electronics, 14(2), March 1999, and by a phase shift carrier disclosed in Karsten Nielsen's "*Audio Power Amplifier Techniques With Energy Efficient Power Conversion*" Department of Applied Electronics, Technical University of Denmark, Lyngby, Apr. 30, 1998. Furthermore, in their "*Modern DC-to-DC Switchmode Power Converter Circuits*", pp 187. e/j BLOOM associates Inc., 115 Duran Drive, San Rafael, Calif. USA, 1984, Rudolf P. Severns and Gordon E. Bloom use the term "tapped-primary quasi-squarewave converter" for a push-pull converter with multilevels at the secondary side. This converter has the disadvantage that the output voltage can never be zero and therefore energy is always transferred to the secondary side due to the fixed duty-cycle of the outer switches. Also the advanced possible regulations (i.e. cascaded regulator) are not declared there.

However, the above technologies have several disadvantages, such as switching one of the switches not against electrical ground, having no further regulation possibilities, and being restricted to outputting only four voltage levels.

Thus, it is desired to provide a new push-pull converter achieving the advantages of the above mentioned technologies while solving the problems thereof.

SUMMARY OF THE INVENTION

A push-pull DC converter for converting an input voltage into at least one output voltage, includes a first supply potential and a second supply potential established by the input voltage. At least one primary winding having two terminals and a center tap at an intermediate point thereof, and two intermediate taps arranged between the terminals and the center tap, where the center tap is connected to the one of the two supply potential, for example, the first supply potential. The converter includes at least one secondary winding, magnetically coupled to the primary winding for providing the output voltage. A first controllable switch is connected between the second supply potential and one intermediate tap, for example, of the primary winding. A second controllable switch is connected between the second supply potential and the other intermediate tap, of the primary winding. A third controllable switch is connected between the second supply potential and the terminal that is adjacent to the one intermediate tap. A fourth controllable switch is connected between the second supply potential and the other terminal that is adjacent to the other intermediate tap, of the primary winding. A control unit controls the switches such that they are turned on sequentially to ensure whenever one switch is turned on, the other switches are turned off.

In operation, the power converter turns on the first, the third, the second, and the fourth controllable switch sequentially where at any time only one switch is turned on; correspondingly, the input voltage is converted into four power voltages out the secondary windings. The above cycle may be repeated continuously to draw power out of the input voltage and to convert it into the output voltage. The symmetry of the arrangement of primary winding sections and the corresponding switches also allows the switches to be switched on in a backward order, that is, the fourth, the second, the third, and the first controllable switch being switched on sequentially.

The power converter of the present invention provides a number of advantages. First, it reduces the difference of voltage rectangulars at the secondary side in the converter to either reduce the ripple current or lower the filter impedances without causing a bigger ripple current. Second, it offers more possibilities for energy conversion by generating more voltage levels and facilitating more regulation opportunities. For example, different voltage/current outputs allow various cross regulation. For another example, with cascaded regulation, two switches can be regulated faster while the other two slower. Third, it can process more power or use lower filter impedances with the same input power and the same output ripple current. Particularly compared to prior art converters, the push-pull DC converter of the present invention has the primary switches thereof switched against electrical ground. Interleave of the multiple voltage levels can also be implemented.

DESCRIPTION OF THE DRAWINGS

The present invention can be better understood with reference to the following drawings and description. The components in the drawings are not necessarily to scale, emphasis instead being placed upon illustrating the principles of the invention. Moreover, in the figures, like reference numerals designate corresponding parts throughout the different views.

FIG. 4A is a table showing the values of signals of the power converter shown in FIG. 3;

FIG. 17 is a signal diagram illustrating the switch control signals;

FIG. 18 is a signal diagram illustrating the switched signals;

FIG. 19 is a signal diagram illustrating the transformer secondary signals;

FIG. 20 is a signal diagram illustrating the rectified secondary signals;

FIG. 21 is a signal diagram illustrating the output current through filter inductor; and FIG. 22 is a spectrum of the signal of the output current through filter inductor.

DETAILED DESCRIPTION

The present invention is further described in detail with references to the figures illustrating examples of the present invention.

Figure 1:
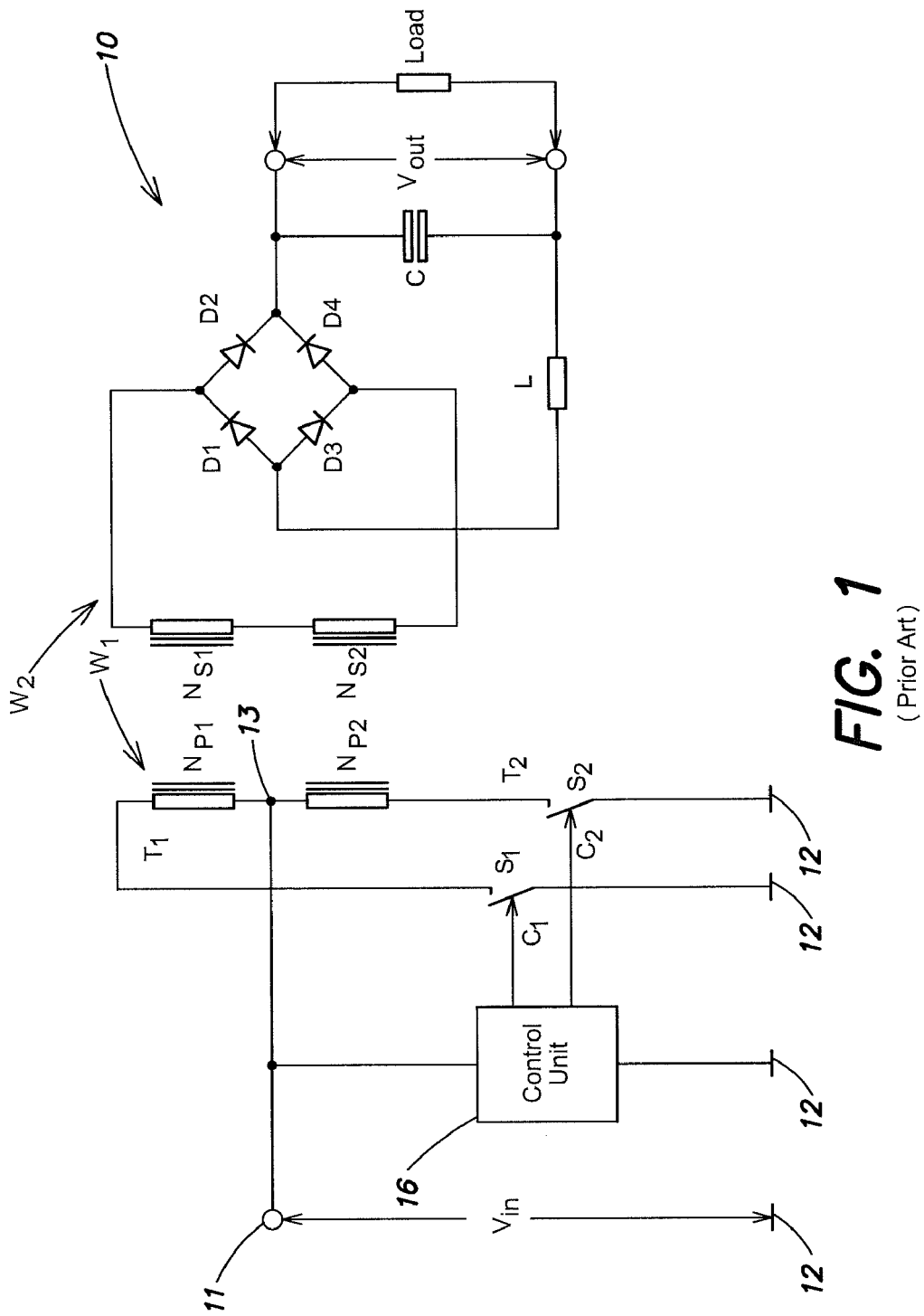
FIG. 1 illustrates the basic circuitry of a conventional push-pull power converter.
Figure 3:
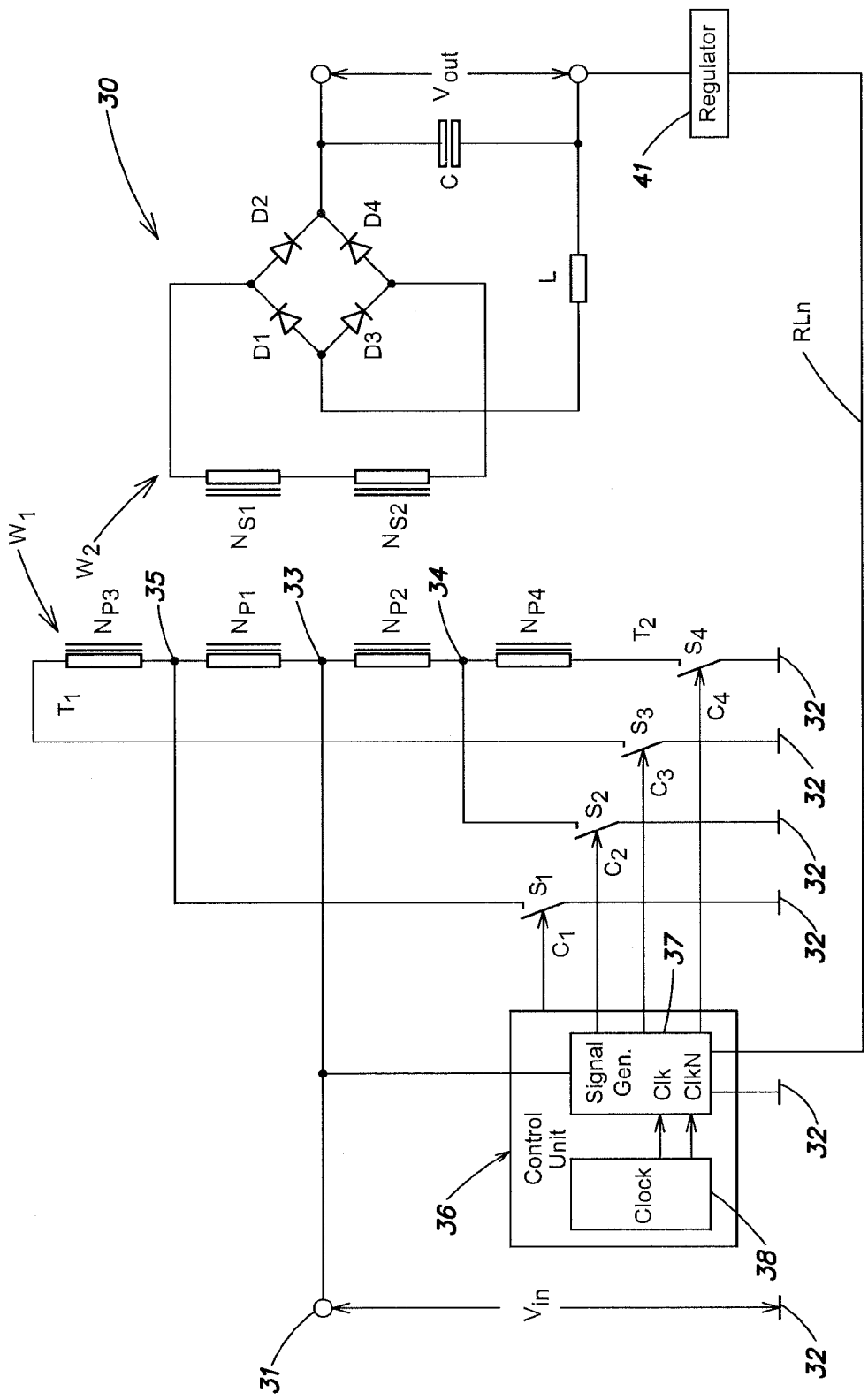
FIG. 3 is a circuit diagram of a power converter.

FIG. 3 is a circuit diagram of a power converter according to an aspect of the present invention. The power converter 30 converts an input voltage Vin into at least one output voltage Vout. Compared to the conventional converter shown in FIG. 1, the power converter 30 includes two additional switches S3 and S4 and two additional primary winding sections Np3 and Np4. Specifically, the power converter 30 includes a first supply potential 31 and a second supply potential 32 established by the input voltage. One of these two supply potentials, here the second potential 32, may be the ground.

The power converter 30 also includes a primary winding W1 that is divided into four sections Np1, Np2, Np3 and Np4, by three taps 33, 34 and 35 arranged between the two end terminals T1 and T2 of the winding. Apart form the center tap 33, which is arranged at an intermediate point of the primary winding W1 and coupled to the first supply potential 31, two intermediate taps 34 and 35 are arranged between the end terminals and the center tap. Particularly, the first intermediate tap, here 35, is arranged between the first end terminal T1 and the center tap; the second intermediate tap 34 is arranged between the second end terminal T2 and the center tap. Thus, the primary winding W1 is divided into four sections: the first Np1 between the center tap and one intermediate tap, here 35; the second Np2 between the center tap and the other intermediate tap, here 34; the third Np3 between the one intermediate tap 35 and the terminal T1 adjacent to the one intermediate tap 35; and a fourth Np4 between the other intermediate tap 34 and the second terminal, T2. Among these primary winding sections, Np1 and Np2 are the same as in the conventional power converter, while the other two, Np3 and Np4, are additional sections.

Further, corresponding to the four primary winding sections, the power converter 30 includes four controllable switches, each connected between the second supply potential 32 and one of the taps/terminals of the primary winding. Particularly, a first controllable switch S1 is connected between the second supply potential 32 and one intermediate tap, for example 35, of the primary winding; a second controllable switch S2 is connected between the second supply potential 32 and the other intermediate tap, 34, of the primary winding; a third controllable switch S3 is connected between the second supply potential 32 and the first terminal T1 that is adjacent to the one intermediate tap 35; and a fourth controllable switch S4 is connected between the second supply potential 32 and the second terminal T2 that is adjacent to the other intermediate tap 34, of the primary winding.

The power converter 30 includes a control unit 36 for controlling the four switches in a way that the first, third, second, and fourth switches S1, S3, S2, S4 are turned on sequentially, in a certain order to be defined below, where at any time a maximum of one switch is turned on. Last but not least, the power converter includes two secondary windings Ns1 and Ns2 magnetically coupled to the primary winding W1 for providing the output voltage Vout. Of course, a different number of secondary winding(s) may be possible. Although not necessary, the power converter may include a rectifying circuit, here D1-D4, coupled to the secondary windings for rectifying the output voltage signals.

Figure 2:
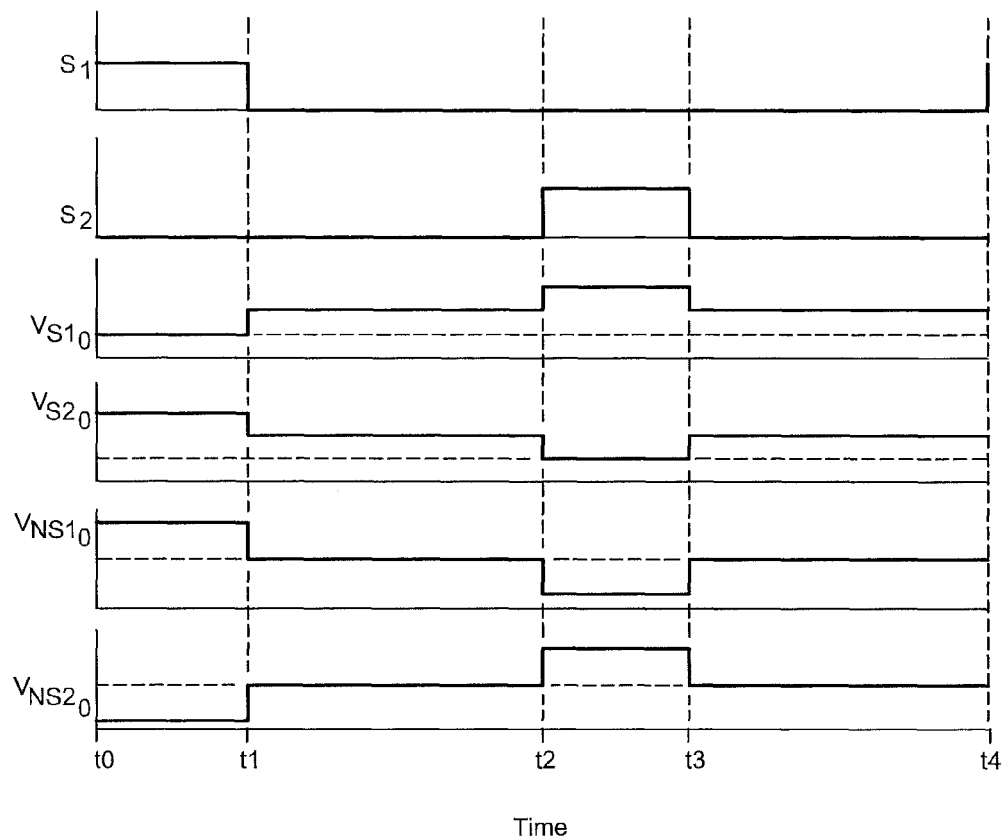
FIG. 2 shows the corresponding signals which apply to the power converter as shown in FIG. 1.
Figure 4:
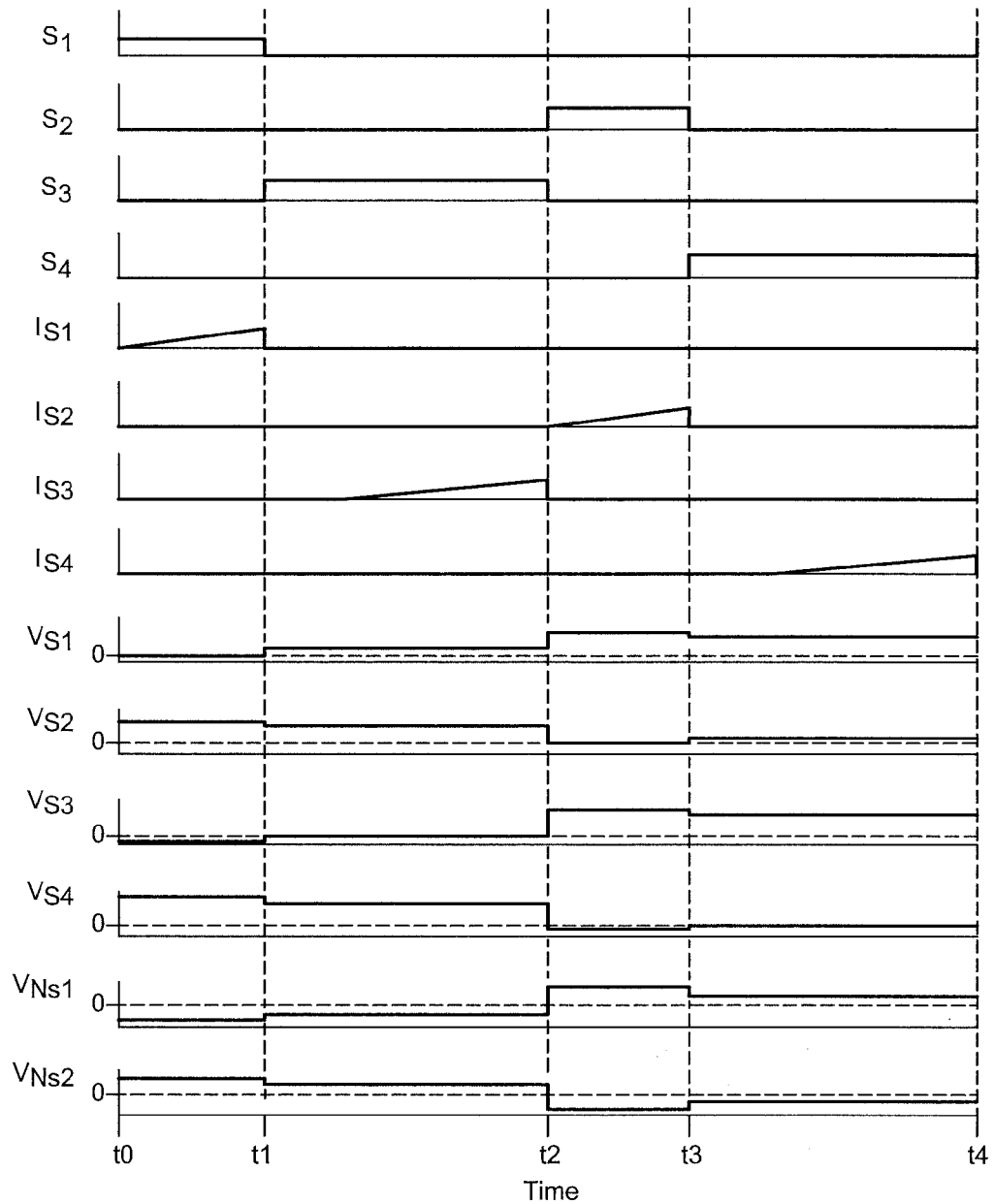
FIG. 4 shows the corresponding signals which apply to the power converter shown in FIG. 3.

FIG. 4 shows the corresponding signals which apply to the power converter as shown in FIG. 3. A brief comparison between FIG. 2 and FIG. 4 reveals that, like in the conventional converter (FIG. 2), all the switches of the power converter 30 (FIG. 4) are turned on sequentially; however, the new converter 30 eliminates the dead time. That is to say, at any time, there is a maximum of one switch turned on. Theoretically, the switches may be turned on in any order. For example, as shown in FIG. 4, the order of the switches being turned on is either a forward order, that is, first switch S1, next switch S3, then switch S2, and finally, switch S4; or a backward order, that is, the first switch S4, next switch S2, then switch S3, and finally, the switch S1. Since these two orders are in symmetry, a detailed description of the operation of this power converter according to the forward order, as below, should be sufficient for one of ordinary skill in the art.

From time t0 to t1, the first switch S1 is turned on (i.e., the voltage across the switch $S_1$, $V_{S1}$, is zero) while the switches S2, S3, and S4 are all turned off (i.e., the voltages on these switches are not zero but are as calculated in the table of FIG. 4A). Therefore, a first current Is1 flows through the first section Np1 of the primary winding W1, causing output voltages $V_{NS1}$ and $V_{NS2}$ to be generated across the (first and second) secondary winding W2, respectively. Next, from time t1 to t2, the third switch S3 is switched on while the switches S1, S2, and S4 are all switched off, causing a second current Is2 to flow through the second section Np2 of the primary winding. Thus, the output voltages $V_{NS1}$ and $V_{NS2}$ across the first and second secondary winding may change from their previous value in the time period from t0 to t1. Then, from t2 to t3, the second switch S2 is switched on while the switches S1, S3, and S4 are all switched off, and a third current Is3 flows through the third section Np3 of the primary winding, bringing about a possible change in the values of the output voltages $V_{NS1}$ and $V_{NS2}$ across the secondary windings. From time t3 to t4, the fourth switch S4 is switched on while the switches S1, S2, and S3 are all switched off, so that a current Is4 flows through the fourth section of the primary winding and the values of the output voltages $V_{NS1}$ and $V_{NS2}$ across the secondary winding(s) W2 may again change.

The above turning on and off of the four switches may be repeated over and over. For each cycle, the voltage signals across all the switches and the secondary winding(s), as well as the current signals flowing through the respective section of the primary winding, can be found in the calculation table of FIG. 4A. In FIG. 4A, the voltages are calculated neglecting the overshoot related to the leakage inductors of the transformer on turning off of each switch; also neglected is a minimal resistance on turning on of each switch. Both effects are present at the conventional power converter, and attenuation methods are well known in the field.

Figure 5:
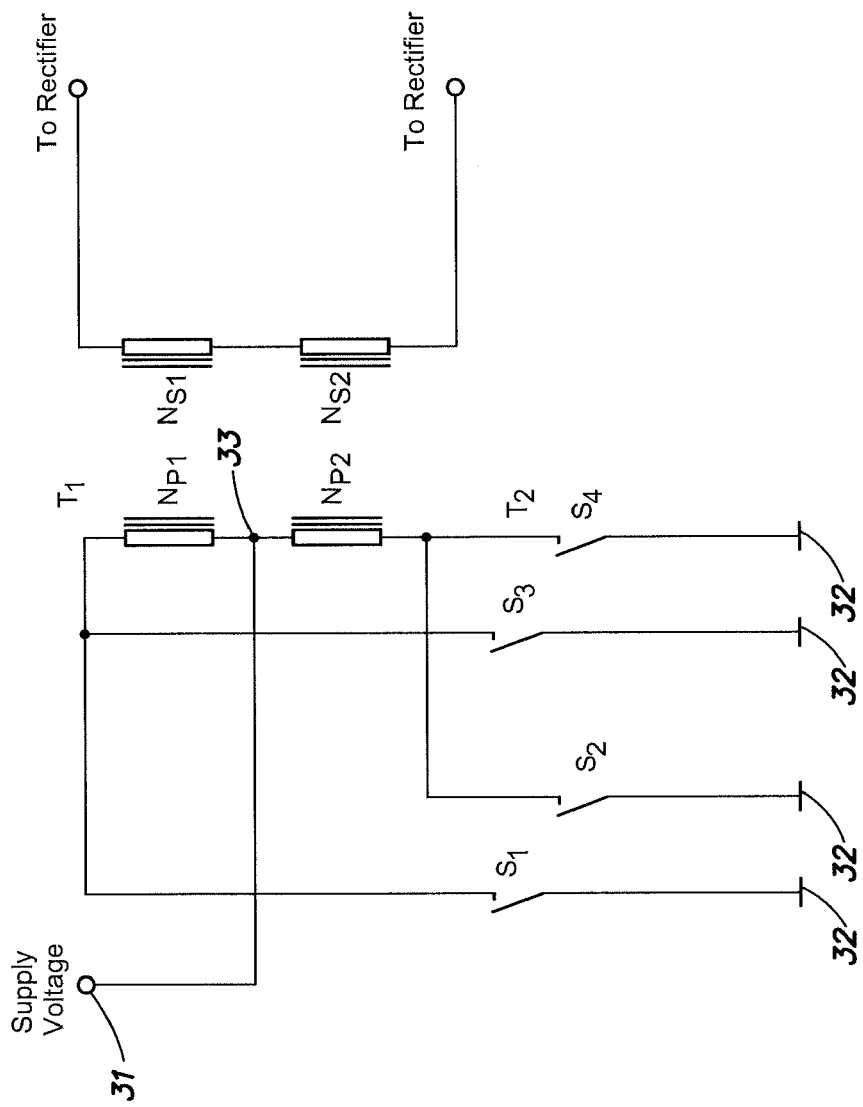
FIG. 5 is a circuit diagram of another power converter.
Figure 6:
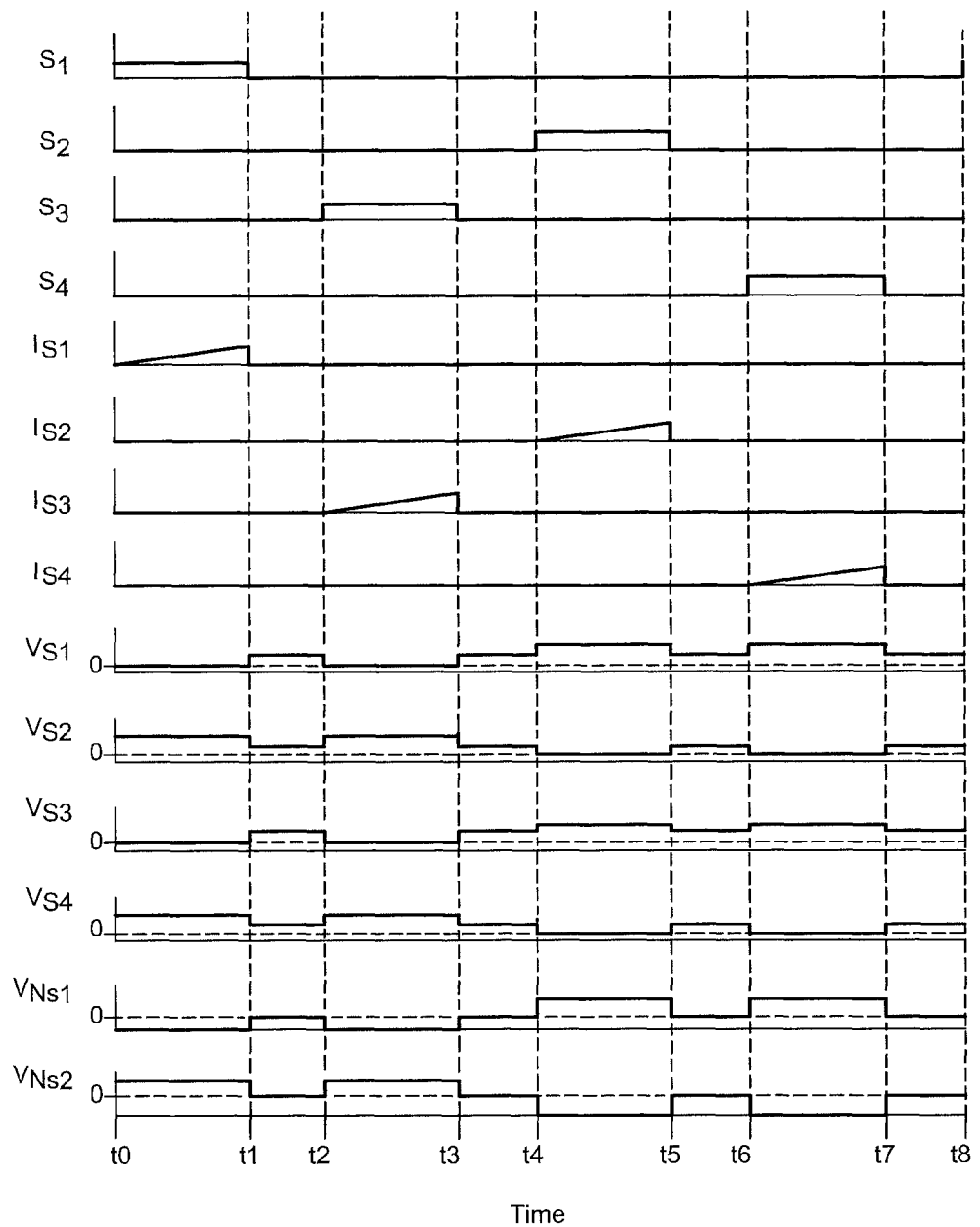
FIG. 6 shows the corresponding waveforms of circuitry shown in FIG. 5.

It is also possible to set the additional primary windings to zero and simply add the switches as shown in FIG. 5. The corresponding waveforms of this circuitry are shown in FIG. 6. With this configuration, adding some dead time between the first switch S1 and third switch S3 (and similar between S2 and S4) would generate four times the ripple frequency and therefore also reduce the filter inductances with the same amount of ripple current or reduce the ripple current with the same filter inductance. Thus, an advantage of this circuitry is that it introduces another multiplier in ripple frequency therefore eliminating further harmonics and decreasing the AC-part of input and output ripple current and voltage. Another advantage of this configuration is that no negative voltage across the switches occurs thus eliminating the need of a reverse polarity diode with respect to the conducting body diode in FIG. 3.

A combination of the circuitry in FIGS. 3 and 5 is also possible (i.e., adding further primary windings to the converter and additional switches (maybe also in parallel) to the topology shown in FIG. 5).

Figure 7:
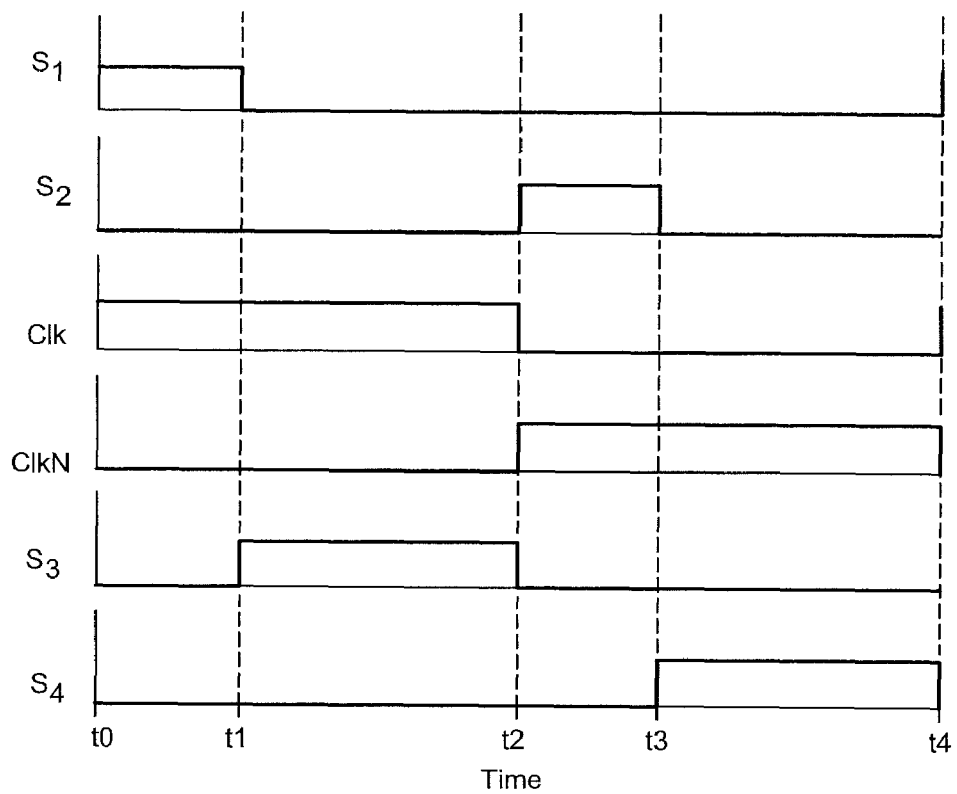
FIG. 7 is a signal diagram illustrating a technique for generating control signals for controlling the two additional switches of the power converter.

Referring again to FIG. 3, the control unit 36 includes a control signal generation unit 37 for generating the required control signals for sequentially turning on and off the four switches in the order as discussed above. Since the two switches S1 and S2 correspond to the conventional power converter, the control signal generation unit 37 may generate the control signals C1 and C2 using known techniques. However, new hardware and/or software functions are incorporated into the conventional control unit for the two additional switches S3 and S4 to generate the corresponding control signals C3 and C4. With these new functions, the control unit 36 may provide various control signal generation techniques. For example, a first, a second, a third, and a fourth control signal C1, C2, C3, and C4 for respectively controlling the first, the second, the third, and the fourth switch S1, S2, S3, S4 may be generated individually; alternatively, the control signals C3 and C4 for controlling the two additional switches S3 and S4 may be generated with the assistance of the already-available control signals C1 and C2 which are for controlling the first and the second switch S1 and S2. FIG. 7 illustrates a technique for producing the additional control signals. This technique uses the help of two clock signals by the digital equation below:

$$C3 = Clk \cdot \overline{C1} = \overline{ClkN + C1}$$

$$C4 = \overline{Clk} \cdot C2 = \overline{Clk + C2}$$

Figure 8:
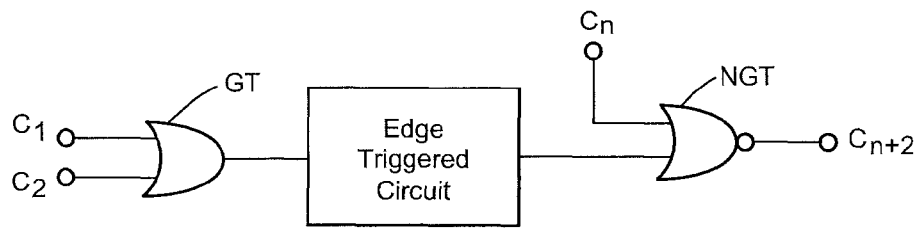
FIG. 8 is a circuit diagram illustrating a technique for generating control signals for controlling the two additional switches of the power converter.
Figure 9:
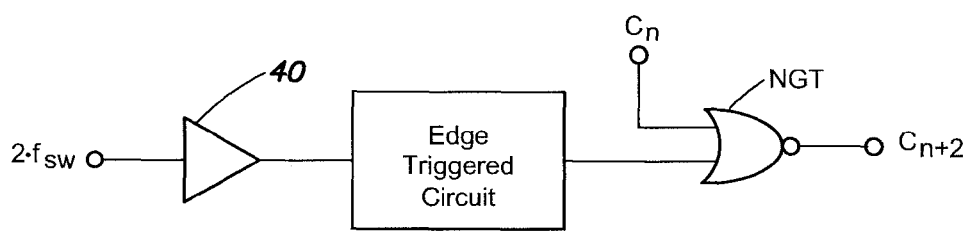
FIG. 9 is a circuit diagram illustrating another technique for generating control signals for controlling the two additional switches of the power converter.
Figure 10:
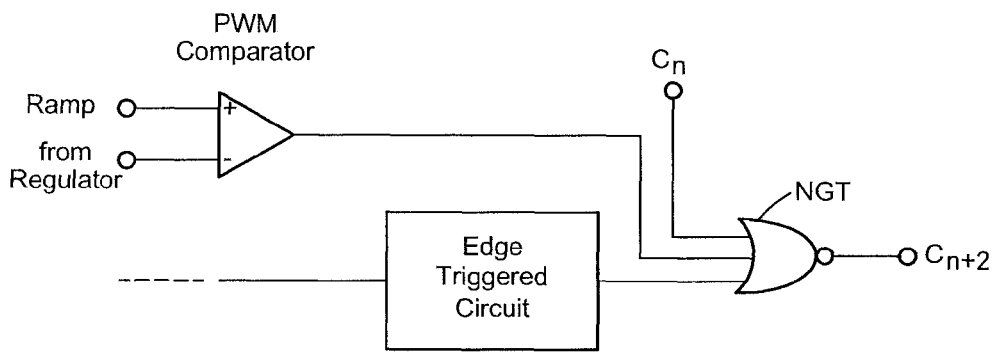
FIG. 10 is a circuit diagram illustrating yet another technique for generating control signals for controlling the two additional switches of the power converter.

FIGS. 8, 9, and 10 illustrate some of the circuitry implementation of this technique.

Referring to FIG. 8, the control signals C3 and C4 for controlling the two additional switches S3 and S4 may be generated with the help of the control signals C1 and C2 for controlling the first and the second switch S1 and S2 and two clock signals, Clk and ClkN. As seen in FIG. 3, the control unit 36 may include a clock signal source 38 that generates clock signals which are coupled to the control signal generation unit 37. One of ordinary skill in the art will recognize that the clock signal source 38 may be placed external to the control unit 36, as long as the clock signals generated by the clock signal source are fed into the control signal generation unit 37. In addition the clock signal source 38 may generate clock signals in various waveforms. Where the clock signal source generates a rectangular clock signal Clk and an invert of Clk (i.e., ClkN) the control signal generation unit 37 may generate the control signals C3, C4 for controlling the two additional switches S3, S4 as determined by the digital equation below.

Based on the first control signal C1, the second control signal C2 and the two clock signals Clk and ClkN, the third control signal C3 and the fourth control signal C4 can be expressed as:

$$C3 = Clk \cdot \overline{C1} = \overline{ClkN + C1}$$

$$C4 = \overline{Clk} \cdot C2 = \overline{Clk + C2}$$

That is, the control signal generation unit 37 may generate the third control signal C3 for controlling the third switch S3 by combining, via an AND gate, an invert of the first control signal (i.e., $\overline{C1}$) with the first clock control signal (i.e., Clk). Similarly, the fourth control signal C4 for controlling the fourth switch S4 may be generated by combining, via an AND gate, an invert of the second control signal (i.e., $\overline{C2}$) with the invert of the second clock signal (i.e., $\overline{ClkN}$). Numerous methods may be implemented to perform the above digital functions in the control signal generation unit 37. For example, a NOR gate ("NGT") receives the first clock signal Clk and the second clock signal ClkN, and the first control signal C1 and the second control signal C2 which are readily available, and then directly generates the third control signal and the fourth control signal as desired.

FIG. 9 is a circuit diagram illustrating the generation of control signals for controlling the two additional switches S3, S4 using a different technique than that of FIG. 8. Instead of using the two rectangular clock signals as described above, FIG. 9 illustrates a technique that uses a double switching frequency $2 \cdot f_{sw}$. Here, a frequency division by two, implemented as a frequency splitter, is implemented and may be realized by an edge triggered circuit with memory function, such as a flip flop. Where the plain clock is not available as input signal $2 \cdot f_{sw}$, an amplifier or a comparator (i.e., element 40) may be added upstream of the edge triggered circuit for forming "perfect" edges, and then the output from the amplifier or the comparator may be used as a trigger signal for the frequency division. The output from the frequency splitter is then used as the clock signals comparable to the case in FIG. 6, and the control signals for controlling the additional switches can therefore be generated.

Similar to FIG. 8, where no switching frequency $f_{sw}$ is available as a rectangular wave form (this case is often found in situations where no clock is available as in self-oscillating push-pull converters often used in television applications), the doubled frequency for triggering the frequency splitter may be generated by taking an OR value of the first control signal C1 and the second control signal C2. That is, an OR gate GT is added upstream of the edge trigger circuit for forming the "perfect" edges. The OR gate GT receives the first control signal C1 and the second control signal C2 as inputs and outputs the ORed value as a trigger signal for the frequency splitter. The output from the frequency splitter is then used as the clock signals comparable to the case in FIG. 8 such that the third control signal C3 and the fourth control signal C4 are generated.

FIG. 10 illustrates a circuit where three signals are input into the NOR gate NGT. Here, the first two input signals are the same as in FIGS. 8 and 9, and the third input signal comes from an additional comparator, such as, but not limited to, a PWM comparator. The PWM comparator compares a ramp signal and a signal from an additional regulator. Such a circuit enables a second and different regulation for the duty cycle of the switches S3 and S4 independent of that for the duty cycle of the switches S1 and S2. As a result, many types of regulation are possible, e.g., slower/faster regulation, cross regulation from other output, to name a few with the result of a regulated dead time after the switches S3 and S4.

The power converter according to an aspect of the present invention provides numerous regulation opportunities to generate many levels of output voltage. As can be seen from the above cases, the control unit 36 causes four voltage levels to be generated on each of the secondary windings $N_{S1}$ and $N_{S2}$. In cases where no energy at the output is required, the pulse width of the control signals C3 and C4 for controlling the two additional switches must bcis regulated, causing a total of five different voltage levels at the output. This can be implemented into the control circuit. Also, a cascaded regulator may be built up, for example, one fast and one slow regulator, or an averaging about two output voltages may be made and therefore multiple voltages may be supervised.

To produce a high ripple frequency, a multi level push-pull converter with four switches may create four times the ripple frequency, when a pulse pause is added before every turning-on of a switch, therefore interleave is generated. The pulse pause is obtained by, for example, a delay device.

As the turning-off edge for the third switch S3 and the fourth switch S4 are generated dependent on the turning-on of the first switch S1 and the second switch S2 respectively, and the edge triggered circuit as well as the NOR gate and an eventually used switch control circuit have some delay times, care must be taken about the rise and fall times of the switches to avoid shoot through currents.

The power converter may be extended by adding pairs of switches and corresponding primary winding sections. If regulation is required, the power converter may further comprise one or more regulation loops RLn (e.g., RL1, RL2, etc.) having regulation circuits 41. The regulation loops, and thus the regulation circuits 41, are coupled between the output voltage and the control unit. The number of the regulation loops is determined by the number of switches that are added to the power converter. There is a minimum number Rmin and maximum number Rmax of regulation loops needed, as defined by the below equations:

$$R_{min} = \frac{K}{2} - 1$$

$$R_{max} = \frac{K}{2}$$

where K is the number of additional switches, which is also the total number of switches minus two. These equations are valid for situations where there are at least two additional switches.

The switches used in power converters according to an aspect of the present invention include MOSFETs, bipolar transistors, thyristors, IGBTs, or other types known in the field. It should be noted that if any switch in the converter contains a diode like the body diode in MOSFETs, a diode in forward priority is added in series to the additional switches to prevent the body diode from shorting the corresponding winding of the transformer. For instance, in the converter shown in FIG. 3, as the voltages on the additional switches S3 and S4 are negative when the corresponding conventional switches S1 and S2 are turned on respectively. Thus, where the converter is realized with any switch maintaining a diode like the body diode in MOSFETs, a diode in forward polarity is added in series to the switch S3 and switch S4 to prevent the body diode to short the corresponding winding of the transformer, which would lead to a transformation of the short directly to conducting switch thus causing high currents which may lead to destroy the converter components.

Simulations showing various signals of the power converter have been conducted and were shown in FIGS. 11-16. These simulations are conducted on the power converter as shown in FIG. 3 and without regulations for the two additional switches S3 and S4.

Figure 11:
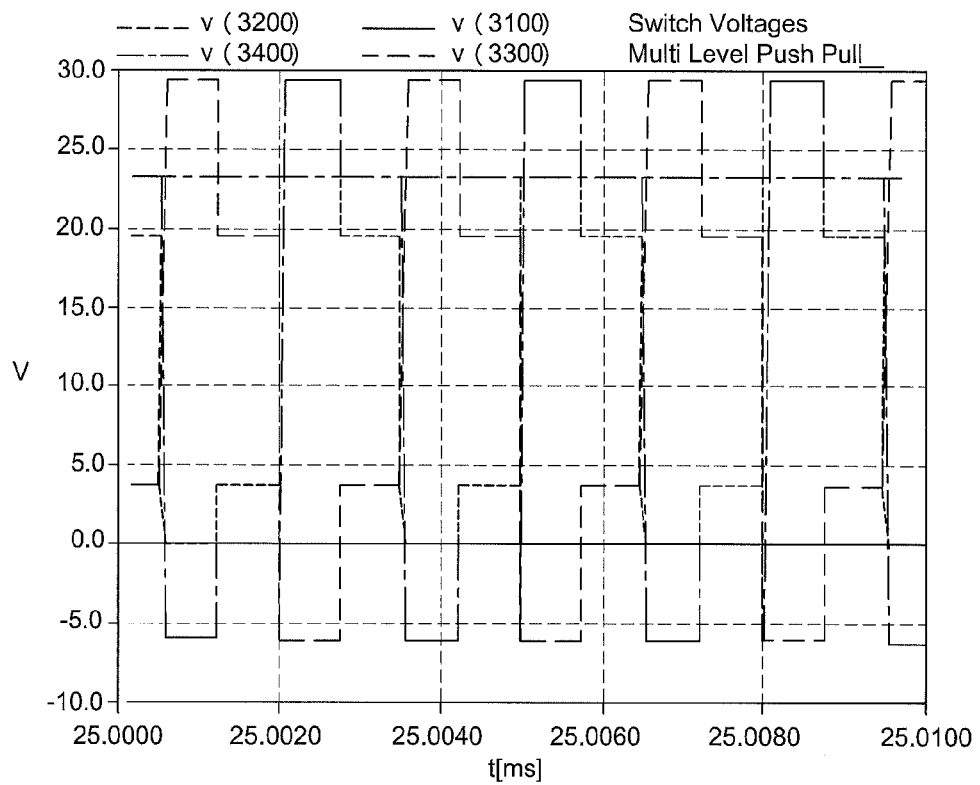
FIG. 11 is a signal diagram illustrating the waveforms of the signals on the primary winding of a power converter.
Figure 12:
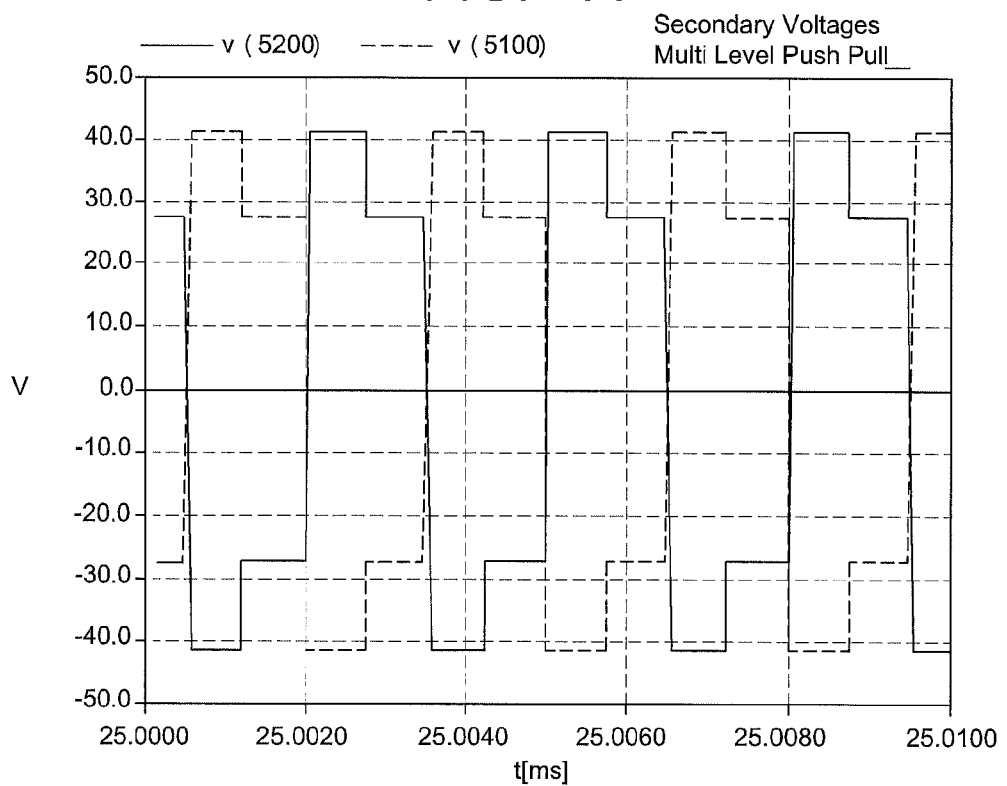
FIG. 12 is a signal diagram illustrating the waveforms of the signals on the secondary winding of a power converter.

FIG. 11 is a signal diagram illustrating the waveforms of the signals on the primary winding of a power converter according to an aspect of the present invention. FIG. 12 is a signal diagram illustrating the waveforms of the signals on the secondary winding of a power converter according to an aspect of the present invention. From these two figures, it can be seen that the power converter generates at least four different levels of output voltage on each secondary winding without any regulation necessary. Of course, using regulation, adding more windings and switches at the primary side, and/or adding more windings at the secondary side, will enable many more levels of output voltage to be generated.

Figure 13:
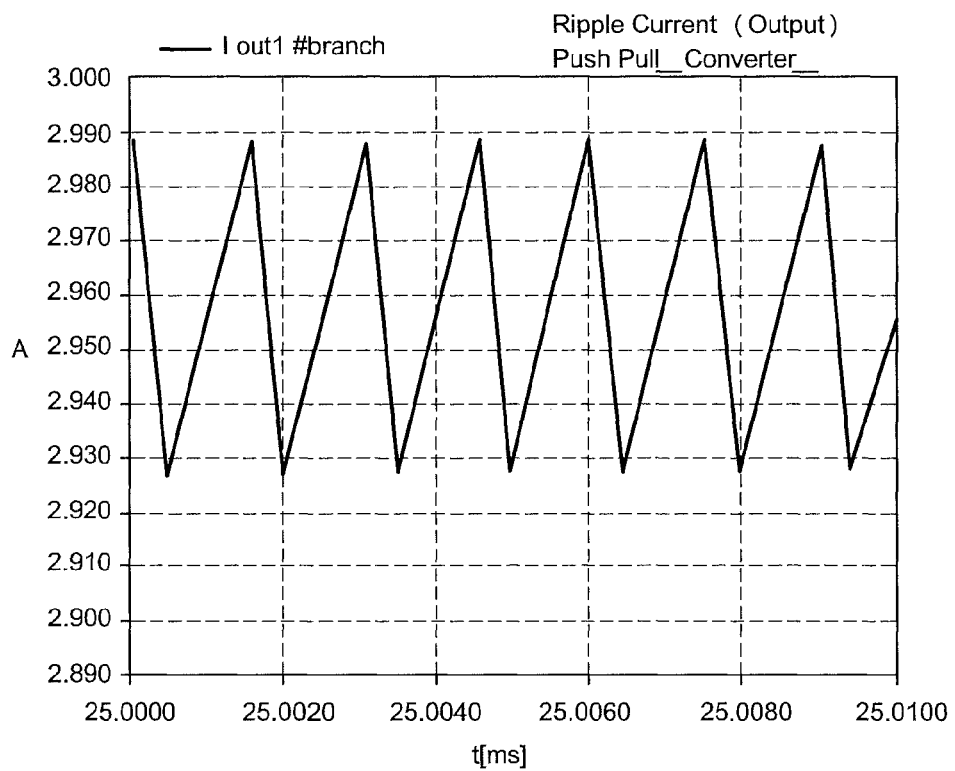
FIG. 13 is a signal diagram illustrating the output ripple current (in the time domain) of a prior art push-pull converter.

FIG. 13 is a signal diagram illustrating the output ripple current (in the time domain) of a prior art push-pull converter.

Figure 14:
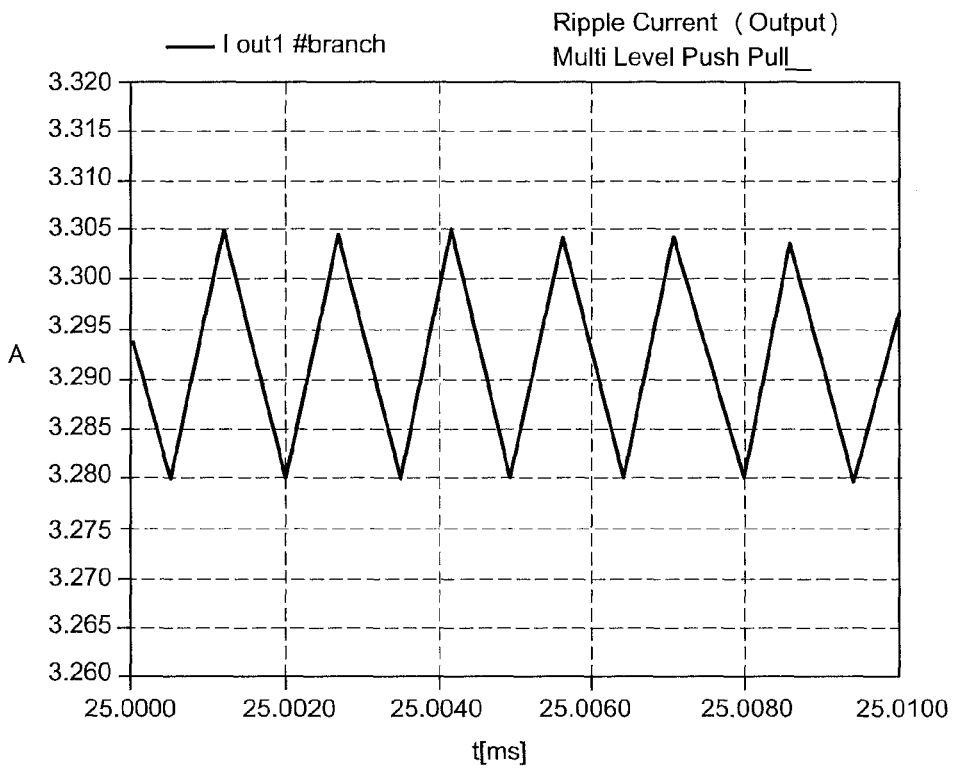
FIG. 14 is a signal diagram illustrating the output ripple current (in the time domain) of a power converter.
Figure 15:
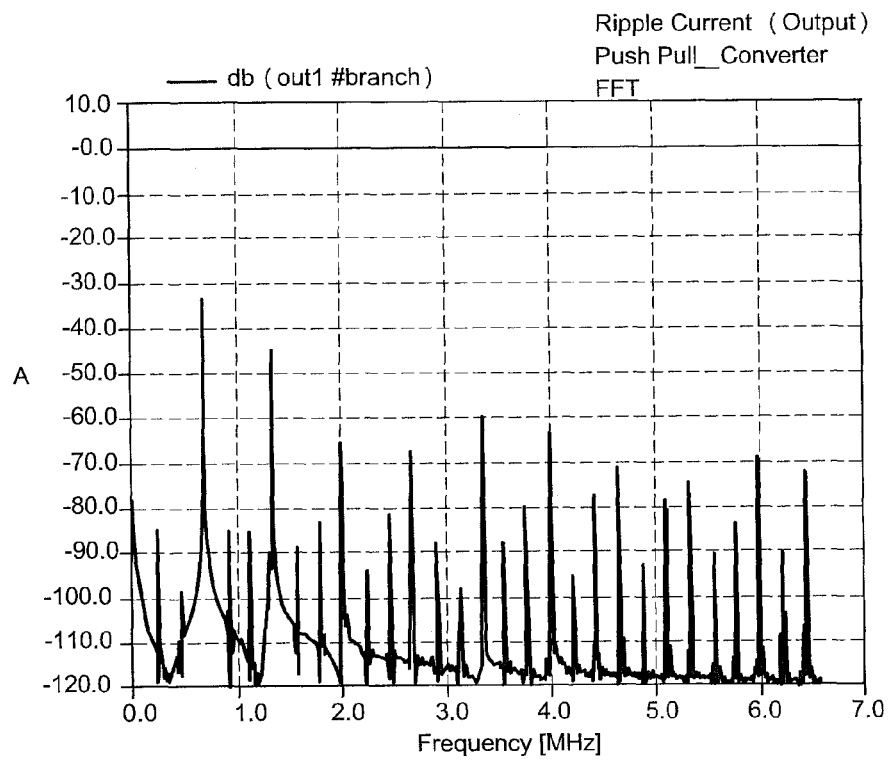
FIG. 15 is a signal diagram illustrating the Fast Fourier Transform (FFT) of the ripple current shown in FIG. 11.
Figure 16:
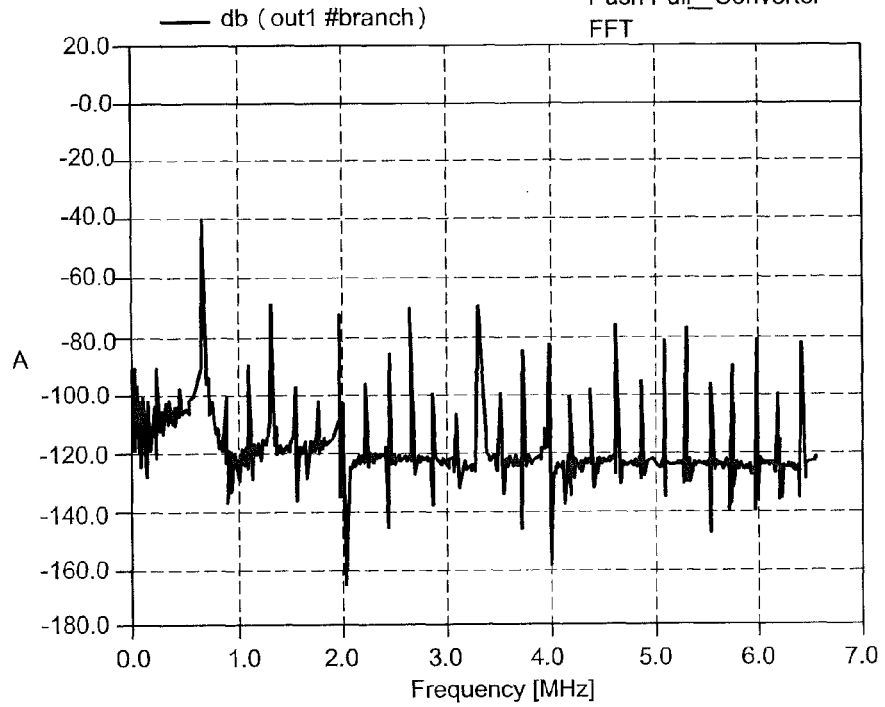
FIG. 16 is a signal diagram illustrating the Fast Fourier Transform (FFT) of the ripple current shown in FIG. 12.

FIG. 14 is a signal diagram illustrating the output ripple current (in the time domain) of a power converter according to an aspect of the present invention. FIG. 15 is a signal diagram illustrating the Fast Fourier Transform (FFT) of the ripple current shown in FIG. 13. FIG. 16 is a signal diagram illustrating the Fast Fourier Transform (FFT) of the ripple current shown in FIG. 14. A comparison between these two groups of figures shows that the power converter can achieve a lower ripple current, thus a lower filter impedance.

Figure 17:
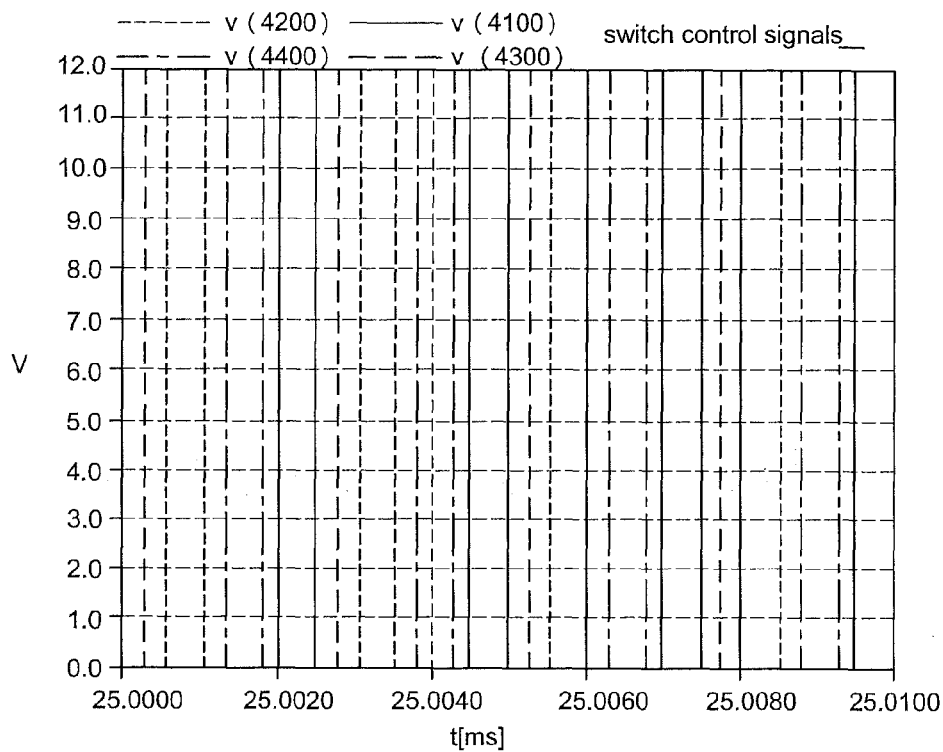
FIGS. 17-22 are signal diagrams showing the signals related to the converter shown in FIG. 5; where
Figure 18:
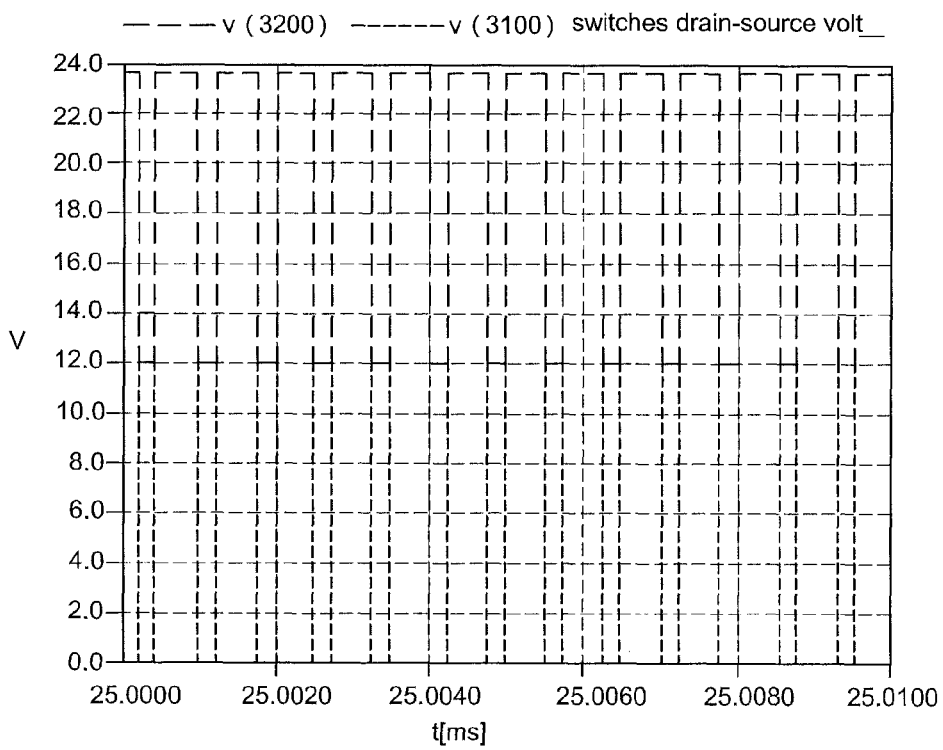
Figure 19:
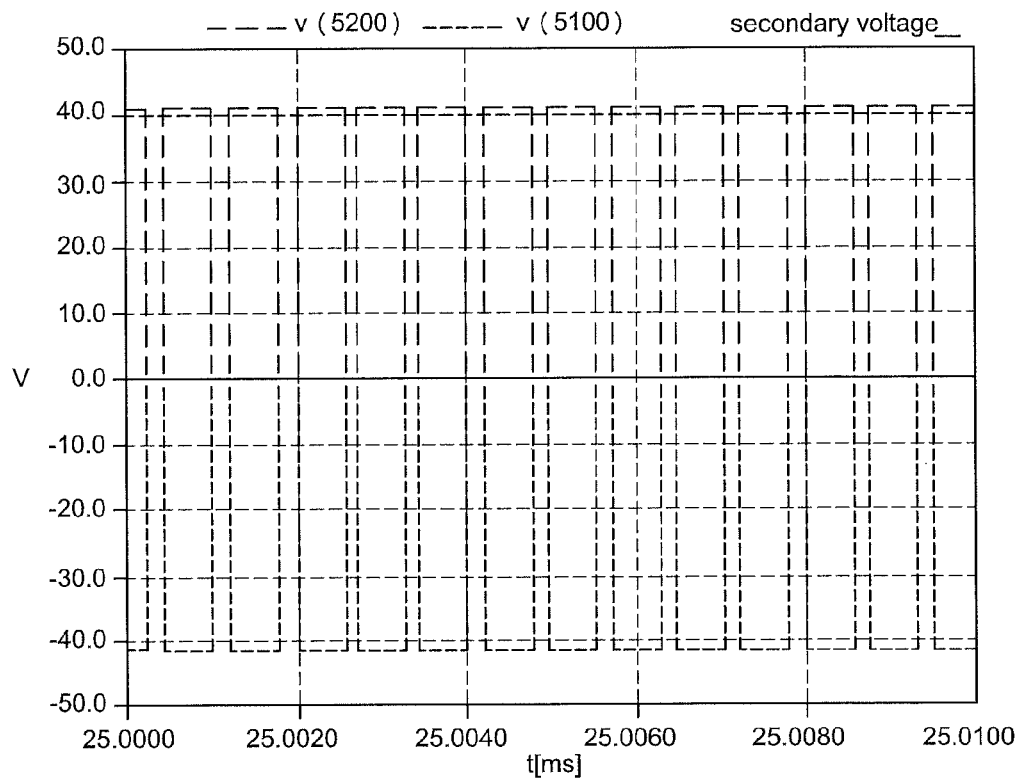
Figure 20:
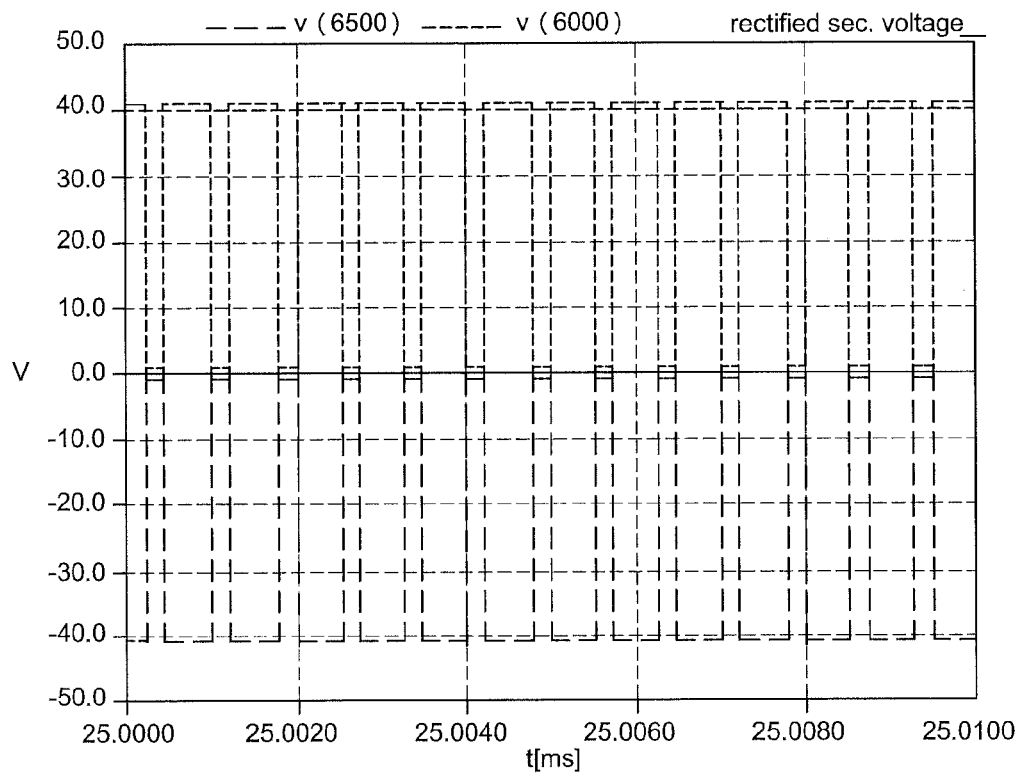
Figure 21:
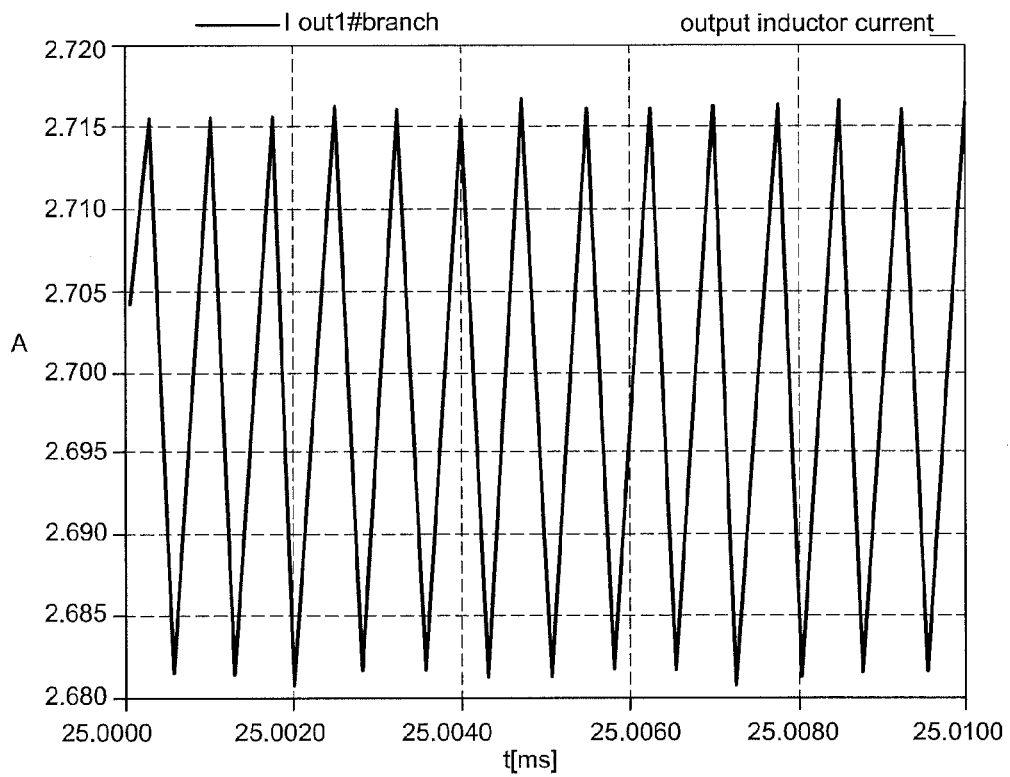
Figure 22:
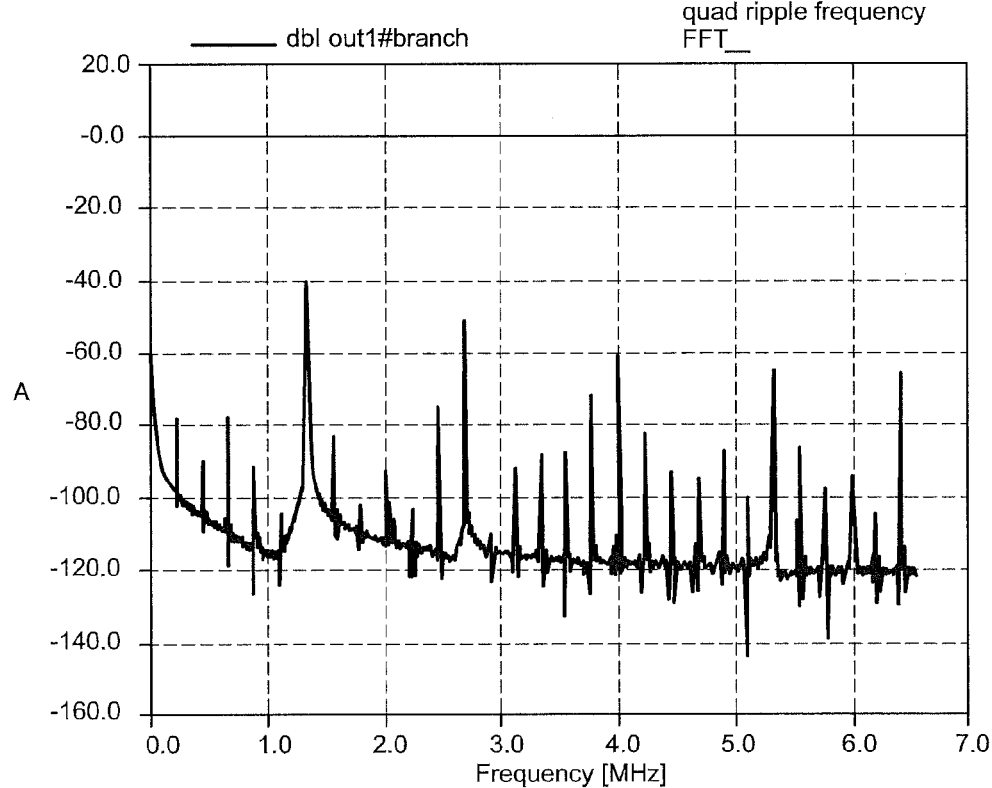

Similar to the above signal diagrams, FIGS. 17-22 show the signals related to the converter shown in FIG. 5. In particular, FIG. 17 is a signal diagram illustrating the switch control signals. FIG. 18 is a signal diagram illustrating the switched signals. FIG. 19 is a signal diagram illustrating the transformer secondary signals. FIG. 20 is a signal diagram illustrating the rectified secondary signals. FIG. 21 is a signal diagram illustrating the output current through filter inductor. FIG. 22 is a spectrum of the signal of the output current through filter inductor.

Although an example of the invention has been described herein above in detail, it is desired to emphasize that this has been for the purpose of illustrating the invention and should not be considered as necessarily limitative of the invention, it being understood that many modifications and variations can be made by those skilled in the art while still practicing the invention claims herein. In particular, the number of sections or windings on the primary and secondary side is preferably any number $2n$ (with n=1, 2, 3, . . . ), e.g. 1, 2, 4, 6, 8 and so on.

What is claimed is:

1. A power converter for converting an input voltage (Vin) into an output voltage (Vout), comprising:
    a primary winding having first and second terminals, a center tap arranged between the first and second terminals and connected to a first supply potential;
    a secondary winding magnetically coupled to the primary winding for providing at least one output voltage;
    a first controllable switch connected between a second supply potential and the first terminal;
    a second controllable switch connected between the second supply potential and the second terminal;
    a third controllable switch connected between the second supply potential and the first terminal;
    a fourth controllable switch connected between the second supply potential and the second terminal; and a control unit for controlling the switches such that (i) the first, the third, the second and the fourth switches or (ii) the fourth, the second, the third and the first switches are turned on successively where at any time a maximum of one of the first, the second, the third or the fourth switches is turned on, where a dead time occurs between turn on periods for the first and the third switches, and where another dead time occurs between turn on periods for the second and the fourth switches.

2. The power converter of claim 1, where the control unit includes a control signal generation unit adapted to generate a first, a second, a third, and a fourth control signal for controlling the first, second, third, and fourth switches, respectively.

3. The power converter of claim 1, where the control signal generation unit comprises at least one NOR gate, the NOR gate for receiving the first and second clock signal and the first and second control signal for generating the third control signal and the fourth control signal.

4. The power converter of claim 1, where the switches comprise MOSFETs.

5. The power converter of claim 1, where the switches comprise bipolar transistors.

6. The power converter of claim 1, where the switches comprise thyristors.

7. The power converter of claim 1, where the switches comprise IGBTs.

8. The power converter of claim 1, further comprising a rectifying circuit coupled to the secondary winding for rectifying the output voltage.

9. The power converter of claim 1, further comprising a plurality of secondary windings magnetically coupled to the primary winding for providing a plurality of output voltages.

10. The power converter of claim 1, further comprising one or more regulation circuits coupled between the output voltage and the control unit.

11. The power converter of claim 10, where the number of the regulation circuits is determined by the number of the switches.

12. The power converter of claim 11, where the regulation circuits are coupled between the output voltage and the control circuit via regulation loops, and where the number of the regulation loops is at least $Rmin=((K/2)-1)$, where K equals the total number of switches minus two.

13. The power converter of claim 11, where the number of the regulation loops is at most $Rmax=K/2$, where K equals the total number of switches minus two.

14. A power converter for converting an input voltage (Vin) into an output voltage (Vout), comprising:
a primary winding having first and second terminals, a center tap arranged between the first and second terminals and connected to a first supply potential;
a secondary winding magnetically coupled to the primary winding for providing at least one output voltage;
a first controllable switch connected between a second supply potential and the first terminal;
a second controllable switch connected between the second supply potential and the second terminal;
a third controllable switch connected between the second supply potential and the first terminal;
a fourth controllable switch connected between the second supply potential and the second terminal; and
a control unit for controlling the switches such that (i) the first, the third, the second and the fourth switches or (ii) the fourth, the second, the third and the first switches are turned on successively where at any time a maximum of one of the first, the second, the third or the fourth switches is turned on, where the control unit includes a control signal generation unit adapted to generate a first, a second, a third, and a fourth control signal for controlling the first, second, third, and fourth switches, respectively, and where the control signal generation unit is adapted to generate the third and the fourth control signal from the first and the second control signal, where a dead time occurs between turn on periods for the first and the third switches, and where another dead time occurs between turn on periods for the second and the fourth switches.

15. The power converter of claim 14,
where the control unit further comprises a clock signal source coupled to the control signal generation unit for generating first and second clock signals, and where the control signal generation unit is adapted to generate the third and the fourth control signal based on the first and the second control signal and the first and the second clock signal.

16. The power converter of claim 15, where the clock signal source generates a first clock signal and a second clock signal, where the second clock signal is the invert of the first clock signal.

17. The power converter of claim 16, where the first and the second clock signals are of the rectangular waveform.

18. The power converter of claim 17, where the control signal generation unit is adapted to generate the third control signal as a signal equivalent to the logic AND of the invert of the first control signal and the first clock signal.

19. The power converter claim 18, where the control signal generation unit is adapted to generate the fourth control signal as a signal equivalent to the logic AND of the invert of the second control signal and the second clock signal.

20. The power converter of claim 14, where the control signal generation unit further comprises a frequency splitter for dividing the frequency of an input signal thereto.

21. The power converter of claim 20, where the frequency splitter divides the frequency of the input signal by two.

22. The power converter of claim 20, where the frequency splitter is edge triggered.

23. The power converter of claim 22, where the edge triggered circuit comprises a latch.

24. The power converter of claim 22, where the control signal generation unit further comprises an OR gate for OR linking the first and second control signals for triggering the edge triggered circuit.

25. The power converter of claim 22, where the control signal generation unit further comprises a comparator for forming edge signals for triggering the edge triggered circuit.

26. The power converter of claim 25, where the edge triggered circuit is a flip flop.

27. A multilevel push pull converter for converting an input voltage (Vin) into an output voltage (Vout), comprising:
a primary transformer winding located between first and second terminals, and a center transformer tap located between the first and second terminals and connected to a first supply potential;
a secondary transformer winding magnetically coupled to the primary transformer winding for providing an output voltage;
a first controllable switch connected between a second supply potential and the first terminal;
a second controllable switch connected between the second supply potential and the second terminal;
a third controllable switch connected between the second supply potential and the first terminal;

a fourth controllable switch connected between the second supply potential and the second terminal; and means for controlling the controllable switches such that (i) the first, the third, the second and the fourth controllable switches or (ii) the fourth, the second, the third and the first controllable switches are turned on successively where at any time a maximum of one of the first, second, third or fourth controllable switches is turned on, where a dead time occurs between turn on periods for the first and the third controllable switches, and where another dead time occurs between turn on periods for the second and the fourth controllable switches.

* * * * *

UNITED STATES PATENT AND TRADEMARK OFFICE
CERTIFICATE OF CORRECTION

PATENT NO. : 7,796,409 B2  Page 1 of 1
APPLICATION NO. : 11/624491
DATED : September 14, 2010
INVENTOR(S) : Arnold Knott It is certified that error appears in the above-identified patent and that said Letters Patent is hereby corrected as shown below:

Column 9
Line 12, delete "must bcis" and insert --is--

Signed and Sealed this

Sixteenth Day of November, 2010

David J. Kappos
*Director of the United States Patent and Trademark Office*